United States Patent
Sharma et al.

(10) Patent No.: US 10,572,374 B2
(45) Date of Patent: Feb. 25, 2020

(54) SYSTEM AND METHOD FOR AUTOMATED SOFTWARE TESTING BASED ON MACHINE LEARNING (ML)

(71) Applicants: Mayank Mohan Sharma, Dublin, CA (US); Sudhanshu Gaur, Mountain House, CA (US)

(72) Inventors: Mayank Mohan Sharma, Dublin, CA (US); Sudhanshu Gaur, Mountain House, CA (US)

(*) Notice: Subject to any disclaimer, the term of this patent is extended or adjusted under 35 U.S.C. 154(b) by 132 days.

(21) Appl. No.: 15/697,436

(22) Filed: Sep. 6, 2017

(65) Prior Publication Data
US 2019/0073293 A1 Mar. 7, 2019

(51) Int. Cl.
- *G06F 11/36* (2006.01)
- *G06N 20/00* (2019.01)
- *G06F 16/22* (2019.01)
- *G06F 11/00* (2006.01)

(52) U.S. Cl.
CPC ........ *G06F 11/3688* (2013.01); *G06F 11/008* (2013.01); *G06F 11/3672* (2013.01); *G06F 11/3684* (2013.01); *G06F 11/3692* (2013.01); *G06F 16/22* (2019.01); *G06N 20/00* (2019.01)

(58) Field of Classification Search
CPC ............. G06F 11/3684; G06F 11/3688; G06F 11/3692; G06F 16/22; G06N 20/00
See application file for complete search history.

(56) References Cited

U.S. PATENT DOCUMENTS

| | | | | |
|---|---|---|---|---|
| 5,463,768 A | * | 10/1995 | Cuddihy | G06F 11/2205 714/37 |
| 8,713,531 B1 | * | 4/2014 | Pettis | G06F 11/3688 717/100 |
| 8,924,938 B2 | | 12/2014 | Chang | |
| 8,949,793 B1 | * | 2/2015 | Basu Mallick | G06F 11/3672 717/124 |
| 9,582,408 B1 | * | 2/2017 | Jayaraman | G06F 16/285 |
| 9,819,758 B2 | * | 11/2017 | Chen | G06F 16/285 |

(Continued)

OTHER PUBLICATIONS

Pamela Bhattacharya et al., "Automated, highly-accurate, bug assignment using machine learning and tossing graphs," 2012 [retrieved on Dec. 19, 2019], Journal of Systems and Software, vol. 85, Issue 10, pp. 2275-2292, downloaded from <url>:https://www.sciencedirect.com. (Year: 2012).*

(Continued)

*Primary Examiner* — Thuy Dao
*Assistant Examiner* — Stephen D Berman
(74) *Attorney, Agent, or Firm* — J. Peter Paredes; Rosenbaum IP, P.C.

(57) ABSTRACT

The invention provides a system and method for automated software testing based on Machine Learning (ML). The system automatically picks up results of the software test automation reports from software test automation framework. The report parser parses the failures from the report. A ML engine compares them with the failures that are known or present in the NoSQL database. After the creation of bug ticket in the defect-tracking tool, an automated notification system notifies the stakeholders via email or instant messaging about the status of the respective ticket. A feedback to the system by software test engineer helps to make the system learn or adjust the decision making to be more precise.

14 Claims, 2 Drawing Sheets

(56) References Cited

U.S. PATENT DOCUMENTS

| | | | | |
|---|---|---|---|---|
| 10,223,240 | B2* | 3/2019 | Bhojan | G06F 11/3684 |
| 10,423,522 | B2* | 9/2019 | Bergen | G06F 11/3688 |
| 2005/0039192 | A1* | 2/2005 | Chavez, Jr. | G06F 1/28 |
| | | | | 719/318 |
| 2006/0248401 | A1* | 11/2006 | Carroll | G06F 11/3423 |
| | | | | 714/38.1 |
| 2008/0082968 | A1* | 4/2008 | Chang | G06F 11/3688 |
| | | | | 717/128 |
| 2009/0182868 | A1* | 7/2009 | McFate | G06F 9/5027 |
| | | | | 709/224 |
| 2012/0072781 | A1* | 3/2012 | Kini | G06F 11/0766 |
| | | | | 714/47.3 |
| 2014/0123110 | A1* | 5/2014 | Wan | G06F 11/3672 |
| | | | | 717/124 |
| 2015/0019912 | A1* | 1/2015 | Darling | G06F 11/2257 |
| | | | | 714/26 |
| 2015/0082280 | A1* | 3/2015 | Betak | G06F 11/3692 |
| | | | | 717/124 |
| 2015/0178634 | A1* | 6/2015 | Chen | G06Q 10/10 |
| | | | | 706/12 |
| 2016/0036652 | A1* | 2/2016 | Bellini, III | H04L 41/5074 |
| | | | | 709/223 |
| 2016/0274997 | A1* | 9/2016 | Kachko | G06F 11/366 |
| 2016/0314064 | A1* | 10/2016 | Moretto | G06F 11/3688 |
| 2017/0068614 | A1 | 3/2017 | Jayaraman | |
| 2017/0249234 | A1* | 8/2017 | Kalech | G06F 11/3616 |
| 2017/0329687 | A1* | 11/2017 | Chorley | G06F 11/3672 |
| 2018/0137035 | A1* | 5/2018 | Magre | G06F 11/3692 |
| 2018/0260428 | A1* | 9/2018 | Patel | G06F 9/45558 |
| 2018/0300227 | A1* | 10/2018 | Bergen | G06F 11/3688 |
| 2018/0349256 | A1* | 12/2018 | Fong | G06F 11/3684 |
| 2019/0004891 | A1* | 1/2019 | Bi | G06F 11/0793 |
| 2019/0065343 | A1* | 2/2019 | Li | G06F 11/3608 |

OTHER PUBLICATIONS

Domenico Cotroneo et al., "A learning-based method for combining testing techniques," 2013, [retrieved on Dec. 19, 2019], Proceedings of the 2013 International Conference on Software Engineering, pp. 142-151, downloaded from <url>:https://dl.acm.org. (Year: 2013).*

Du Zhang et al., "Machine Learning and Software Engineering," 2003, [retrieved on Dec. 19, 2019], Machine Learning and Software Engineering. Software Quality Journal 11, pp. 87-119. (Year: 2003).*

* cited by examiner

SYSTEM AND METHOD FOR AUTOMATED SOFTWARE TESTING BASED ON MACHINE LEARNING (ML)

DESCRIPTION OF THE INVENTION

Technical Field of the Invention

The present invention relates to an automated software testing. More particularly, the invention relates to an automated bug finding, triaging, filling and notification system based on Machine Learning (ML).

BACKGROUND OF THE INVENTION

Machine Learning (ML) is a field of computer, which explores the study, and construction of algorithms that make predictions on data—such algorithms making data-driven predictions or decisions, through building a model from sample inputs. ML algorithms are a collection of programs mainly based on solving classification problem, applying logistic regression, and are used to derive error/cost optimization model.

Software testing is the process by which it is validated and verified that the software works as expected based on the provided or required specifications. Software test automation is the process by which the need to repeatedly manually test certain functionalities of the software is eliminated, by deploying or using programs and script to do the same.

The manual software testing is a labor-intensive process that takes significant number of man-hours in bug triaging and bug filing which is costly and inefficient. Test automation's full potential is not utilized when the test results are looked and analyzed manually and hence, the performance edge given by automation gets neutralized due to manual intervention.

The process of finding errors (from the log files), triage and file, a bug takes at least 20-30 minutes to find out whether the bug has been previously filed or not. These steps are being followed by sending mails or tag developers for communicating bug discovery etc. In this process, the quality can take a hit at times, if there are too many bugs/exceptions. Current systems do not provide the visibility/ability to find out which test suite(s) is erroneous, so that immediate action can be taken. Creation of analysis-based dashboard from the current process is difficult, as it will have to be updated manually as the final decision of filing or not filing a bug is taken manually.

The U.S. patent application Ser. No. 14/929,961 (referred herein as '961) titled "System and method for optimizing testing of software production incidents" discloses a system and method for optimizing testing of software production incidents. The method comprises analyzing an incident ticket using a machine-learning algorithm to identify one or more keywords in the incident ticket, and identifying a location of the incident ticket based on one or more keywords. The system comprises a processor and a memory communicatively coupled to at least one processor. The memory stores processor-executable instructions, which, on execution, cause the processor to categorize an incident ticket received from one or more sources based on one or more pre-defined parameters. The incident ticket corresponds to an obstruction in a software production. However, the system does not disclose autonomous learning, predication, decision-making, feedback and dashboards based deep insights.

The U.S. patent application Ser. No. 11/863,387 (referred herein as '387) titled "Software testing using machine learning" discloses a system and method for analyzing a computer program includes performing a static analysis on a program to determine property correctness. A system and method for analyzing a computer program includes performing a static analysis on a program to determine property correctness. Test cases are generated and conducted to provide test output data. Hypotheses about aspects of execution of the program are produced to classify paths for test cases to determine whether the test cases have been encountered or otherwise. In accordance with the hypothesis, new test cases are generated to cause the program to exercise behavior, which is outside of the encountered test cases. However, the system does not disclose software defect, bug finding, triaging, filling and notification.

Hence, there exists a need for a system, which automates the software testing to perform bug finding, triaging, filling and notification in an efficient manner.

SUMMARY OF THE INVENTION

The present invention overcomes the drawback in the prior art and provides an automated software testing based on Machine Learning (ML) to perform automated bug triaging, filling and notification in an efficient and precise manner.

The system comprises a software test automation framework, which has a collection of automated test suite and test execution results. A report parser parses the test execution results generated by the software test automation framework and is configured to identify failures or exceptions with their respective stack traces. NoSQL database is configured to hold historical defect, bug tickets with the past failures or exceptions. Further, ML engine evaluates the matching results of the NoSQL database and is configured to predict type of the failure or exception. A defect-tracking tool is configured to create relevant bug tickets based on the type of failure or exception. An automated notification system is configured to notify the status of a bug ticket to the stakeholders. A dashboard facilitates the access results, logs, failures, key performance indicators etc. in the form of histograms, pie graphs, etc. Furthermore, a manual feedback mechanism is provided for adjusting the ML algorithm.

The system parses the current failures (or errors) from the report and then compares them with the failures that are known or present in the bug/defect tracking system. ML helps the system to make the decision based on the failure logs for example, if a bug has to be considered as new, deferred or if it is an already existing issue in the defect tracking system. Once the decision has been made by the system, the ticket's respective status is also changed.

Thus, the invention provides an autonomous learning, prediction and decision-making as it is an automated ML based system, which finds, triages and files the bugs. The system also has the inbuilt feature to provide notifications to all stakeholders.

Further, the advantage of the present system is that it is highly scalable because the integration is easy. The centralized ML engine needs not to be changed for any test automation framework or testing type i.e. mobile apps, application-programming interface, front-end systems etc.

Further, the feedback mechanism is provided in the system to fine tune the quality. Since all the processes are automated, it saves time of the concerned persons. Algorithms and programs control quality so any number of defects can be handled easily.

Furthermore, the system provides dashboard based deep insight that makes it easy to glance through the quality of the automated test suites via dashboards. Overall quality can be checked and immediate action can be taken based on the observations. Creation of dashboards is easy, as the whole process is automated end to end.

BRIEF DESCRIPTION OF DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The invention provides a system and method for automated software testing based on machine Learning (ML). ML based automated bug triaging, filing and notification system is a new approach in software testing field. The invention makes the present-day test management life cycle more productive, efficient and a self-decision-making system, which is fast and reliable. The invention is based on supervised/semi-supervised learning to make all processes automated and time saving. Algorithms and programs control quality so that any number of defects can be handled in an efficient manner.

Figure 1:
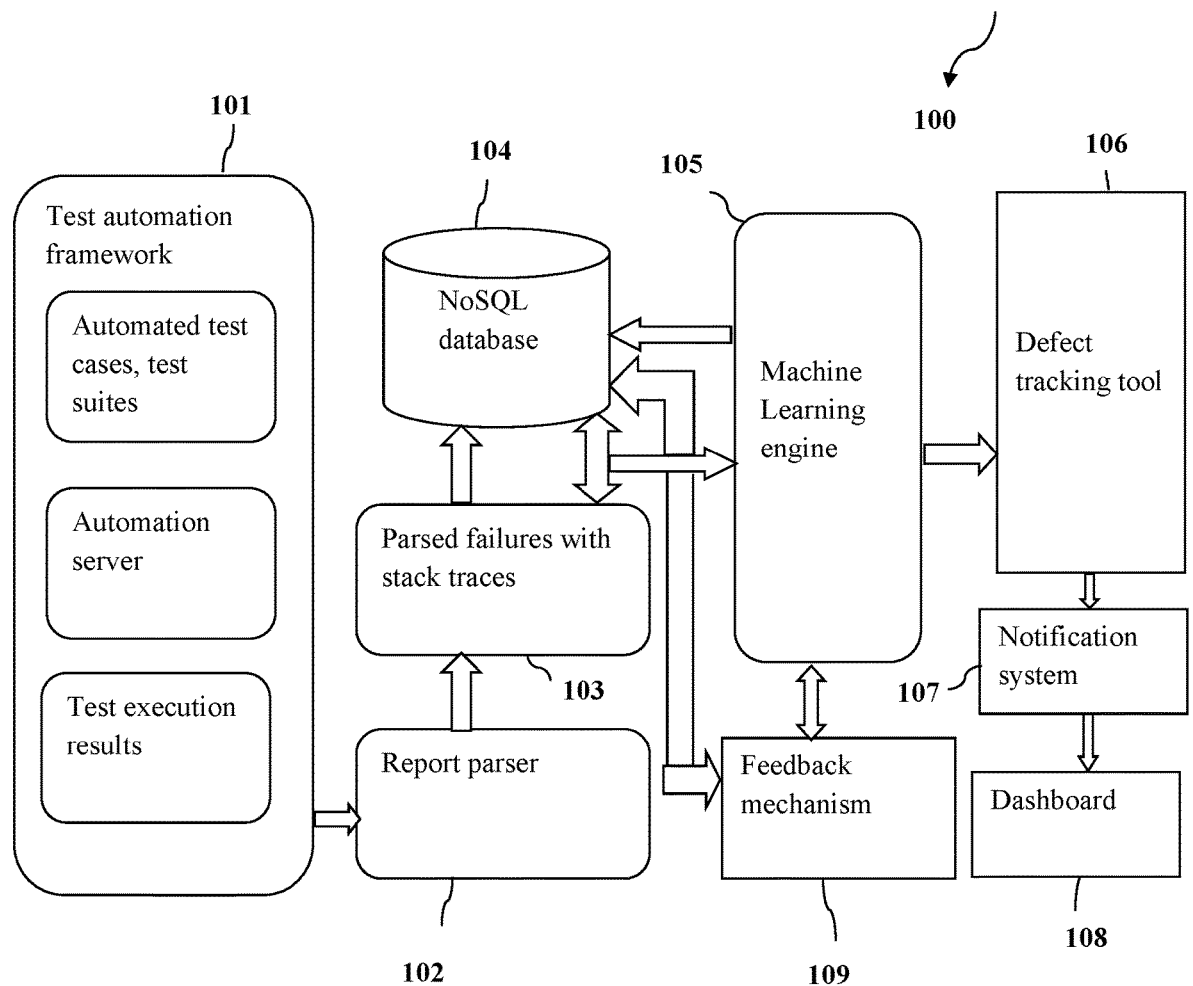
FIG. 1 illustrates the system for automated software testing based on ML.

FIG. 1 illustrates the system for automated software testing based on Machine ML. Preferably, software test automation framework 101 is a collection of programs and scripts which includes automated test cases, packages/dependencies, build configurations, and other utilities. This framework resides in a software configuration management repository like GitHub and can be run using a test automation server like Jenkins. This test framework is targeted towards testing an application like a web application, mobile application and any other type of software application for which the automated test cases were written to provide us with desired test results.

In a preferred embodiment of the invention, software test automation framework 101 contains automated test cases and automated test suite. The automated test case codes may be written in any preferred programming language such as Python and the like. Automated test suite is basically a collection of automated test cases, page objects, helper or utility programs. The test suites are run through an automation server. Automated server is a server which acts an interface or tool to easily configure or bring together the requirements/dependencies/frameworks/test suites to execute programs to obtain the desired results. One can set the time for these jobs as per as desired schedule or preferences either to run automated tests or to build software, mobile applications etc.

In a preferred embodiment of the invention, when the automated tests are run they provide the results in a predetermined format. Report parser parses these results to capture failures or exceptions with their respective stack traces. Report parser 102 is a program, which goes through whole content of the result file and searches for certain attributes or keywords.

In an embodiment of the invention, the test automation results are obtained in any desired format, preferably a XML format. The system picks the XML file with records results from the Jenkins server location and by using a preferred programming language (e.g. Python based parsing scripts in this case), it goes through the length and breadth of the XML file to filter out all the respective failures or exceptions for respective tests with respective stack traces 103. The recording of the parsed results is done in a NoSQL database 104 table where these will be compared with historical results for further processing.

In a preferred embodiment of the invention, failures or exception and the list of historically captured failures or exceptions that already has defect/bug tickets, are stored in a NoSQL database 104 to facilitate the current comparison of theirs with the newly encountered failures or exceptions.

In an embodiment of the invention, once the failure or exception is found in the NoSQL database, the ML engine 105 detects whether a defect ticket is created in the past for the automated test. In such cases, the failure or exception is not new but known and is already filed/recorded and considered for debugging.

In a preferred embodiment of the invention, when ML engine 105 is unable to find the current failure or exception in the historical data then it recognizes that it is a new problem that has been found and it needs to be filed as new defect. ML engine 105 uses the test management tool and its Application Programming Interfaces (APIs) to file the failure or exception as a new defect and upload all the related stack traces or exceptions in the ticket.

In an embodiment of the invention, the severity of the bug and the priority of the test case that have failed remains the same if it is a failure that was historically encountered. But if the failure is new, then ML engine 105 gets the priority of the automated test case for which the failure occurred and the severity of the defect can be mapped in two ways. In the first way, if the test case that failed has high priority then the bug is considered to be of high severity and if the test case failed, it is of low priority, which means that the bug is of low severity. In this way, the system has a mechanism to map the severity of the failure to the defect ticket. In the second way, the ML engine 105 provides the ability to learn by looking at the failure or exception and stack traces that when such an exception occurred and what was the severity of the defect ticket. This learning is unsupervised as the ML takes historical data to learn the same.

Preferably, in case the severity predicted by ML algorithm is not correct as per test engineer he can change the mapping of severity for such types of failure or exception in the machine learning NoSQL database 104 mapping structure. This is the feedback that helps in making the ML more accurate and precise.

In a preferred embodiment of the invention, ML is not equipped to deal with all kinds of scenarios and exceptional cases as it is built upon the idea that it would learn based on the data provided, and to learn in a supervised and an unsupervised manner. The feedback mechanism 109 helps in fine tuning or adjusting the ML algorithm such that one can make some of its learning more precise and targeted towards providing with outputs that one can make sense of. Further, the feedback mechanism is provided in the system to fine tune the quality. Since all the processes are automated, it saves time of the concerned persons. Hence, the algorithms and programs control the quality so any number of defects can be handled.

Yet another embodiment of the invention, prediction of failures includes creation of bug tickets in the defect-tracking tool. Ticket creation means logging the failure or exception as a defect or bug in the bug/defect tracking tool 106 i.e. for e.g. JIRA, Bugzilla etc., so that a developer can look at it to fix it.

In a preferred embodiment of the invention, if the failure is new then a new bug ticket is created and the status of the new ticket is kept as "open". If the failure is already present in the defect tracking tool 106 and the status of the bug ticket is "closed" then the status of the bug ticket is changed as "reopen". If the failure is already present in the defect tracking tool and the status of the bug ticket is either "known", "deferred", "open", "reopen" then the system will add a comment with current failure details. All this is done through the defect/bug tracking system's Application Programming Interface (APIs).

Preferably, the timeline of the release can be predicted based on the number of defect or bugs that have filed in the form of new or reopened tickets. The timeline of the release is directly proportional to number of new tickets created or reopened. The developer who fixes the issue does this estimate manually. ML engine is intended to predict the time a developer takes to close ticket based on certain type of failure or exception using same unsupervised learning based ML techniques have been used in the bug triaging and filing system.

In a preferred embodiment of the invention, the notification of the stakeholders is done by an automated notification system 107, when the ticket is created or reopened in the defect tracking system. The notification is done via email or instant messaging about the respective ticket.

In a preferred embodiment of the invention, dashboard 108 is configurable to graphical user tools/programs/interfaces by which one can easily access the results, logs, failures, key performance indicators etc. in the form of histograms, pie graphs, etc. They access data from the database usually.

Figure 2:
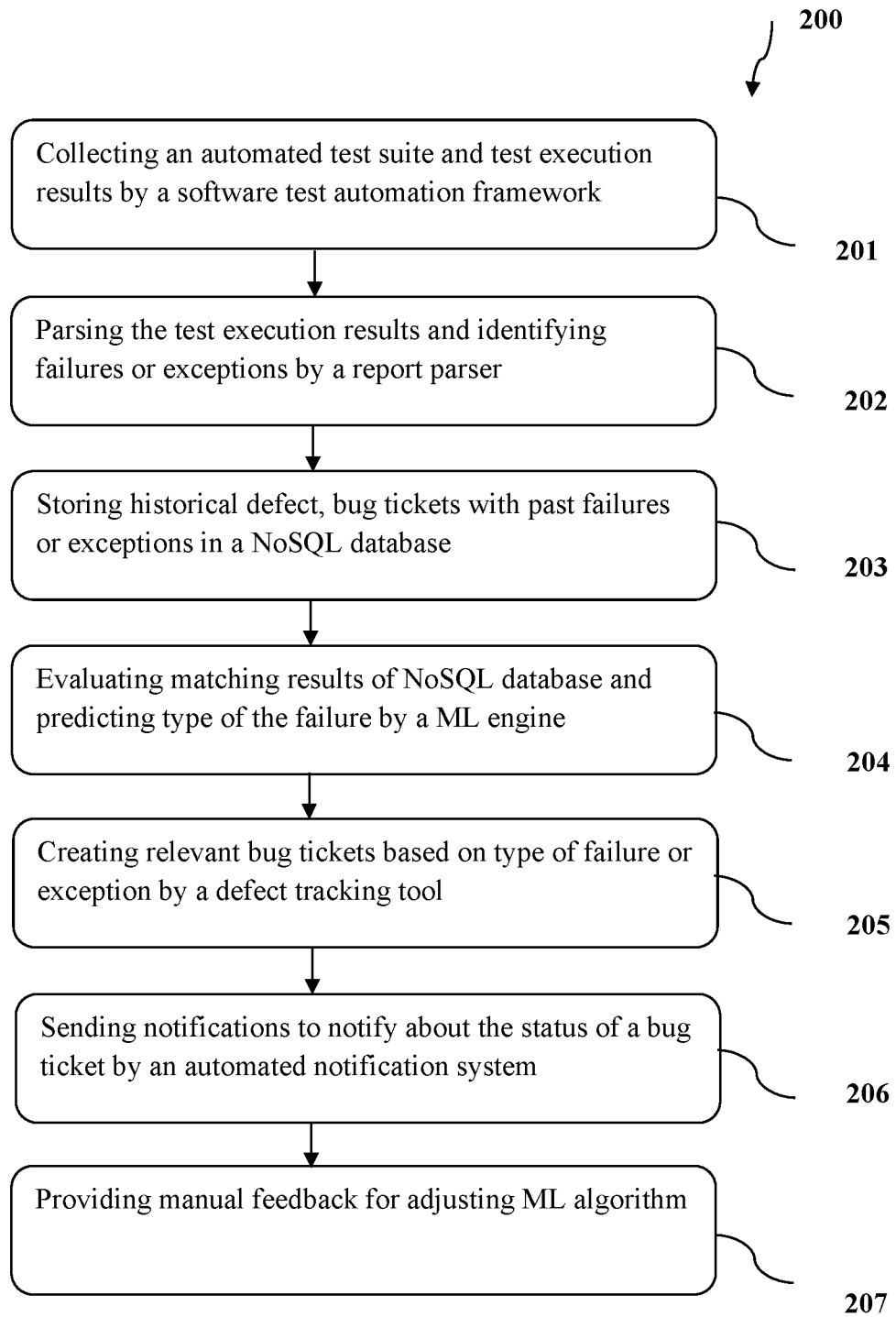
FIG. 2 illustrates a method for automated software testing based on ML.

FIG. 2 illustrates a method for automated software testing based on ML, in accordance to one or more embodiment of the present invention. The method for automated software testing based on ML comprises the steps of collecting a test suite and test execution results by a software test automation framework on a regular basis, which could be hourly, nightly, weekly etc. at step 201. At step 202, the report parser parses the test execution results generated from the software test automation framework to provide the failures or exceptions with their respective stack traces. At step 203, NoSQL database stores historical defect, bug tickets with past failures or exceptions. At step 204, ML engine evaluates the matching results of NoSQL database and predicts the type of the failure or exception. Further, defect-tracking tool creates relevant bug tickets based on the type of failure or exception at step 205. An automated notification system gives notifications to notify the stakeholders about the status of a bug ticket at step 206. Furthermore, a manual feedback mechanism provides for adjusting ML algorithm and NoSQL database table entries at step 207.

In accordance to one embodiment of the invention, the method for predicting the failure or exception further comprises the steps of creating a new ticket. The steps include, keeping the status as "open" if the failure is new. Changing the status of the bug ticket to "reopen" for existing failure, if the status of the ticket is "closed", and adding comment with the failure details for the known and deferred failures after changing the status of bug ticket to "reopen".

In an embodiment of the invention, once the bug ticket is created or reopened, the system will automatically notify the stakeholders via email or instant messaging about the status of the bug ticket. Hence, whole process will be automated. Therefore, there will no human intervention unless the algorithm or the ML engine has to adjust via feedback. This makes the system more precise and consumes less time in debugging the errors.

Compared to the current state-of-the-art software testing methods, the present invention offers faster operation and higher quality results due to a more focused analysis, ML algorithm and feedback mechanism. In comparison to static software analysis tools, the present invention offers a way to scale the analysis to find deep and intricate potentially multi-threaded software bugs. Furthermore, by using ML to learn program behavior, the present approach provides heuristics to automatically mine for hypothetical program-dependent properties. The present principles related to computer software development and testing, in particular, for improved software testing based on ML, incorporate a report parser, NoSQL database, feedback mechanism and a dashboard. It would be easy to glance through the quality of the automated test suites via dashboard. Hence, the overall quality can be checked and immediate action can be taken based on the observation.

Further, the techniques described in the various embodiments discussed above result in efficient, robust, and cost-effective management and testing of software production incidents subsequent to release of a software product. The techniques described in the embodiments discussed above provide an automated process of testing a defect that is found in production, thereby ensuring a consistent and predictive delivery of software product quality. ML and feedback mechanism of the process ensure that the process keeps improving its efficiency after putting to use. The feedback mechanism further receives feedback from the users for continuous improvement of the process. Additionally, the techniques described in the embodiments discussed above analyze the production defects and learn from the pattern, correlate the defects with the existing test cases, and ensure a smooth build, run, and reinstallation into production. Further, the techniques described in the embodiments discussed above are easy to build and use and can be integrated with any system.

The description of the present system has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed:

1. A system for automated software testing based on Machine Learning (ML) during a pre-release stage of a software product, the system comprising:
   a memory to store instructions contained in a software test automation framework, a report parser, a ML engine, a defect-tracking tool, an automated notification system, and a dashboard to perform the automated software testing based on machine learning during the pre-release stage of a software product;

a processor operatively coupled to the memory, wherein the processor is configured to execute instructions stored in the software test automation framework, the report parser, the ML engine, the defect-tracking tool, the automated notification system, and the dashboard to perform the automated software testing based on machine learning during pre-release stage of a software product, wherein:

the software test automation framework comprising one or more automated test suites to test a software application to provide one or more and test execution results in a desired form;

the report parser configured to parse the test execution results generated by the software test automation framework and to identify failures or exceptions present in the test execution results with their respective stack traces;

a NoSQL database configured to hold historical defect, bug tickets with past failures or exceptions;

the ML engine configured to evaluate matching results of the NoSQL database and to predict type of the failure or exception, wherein the ML engine is configured to:
compare the identified failures or exceptions received from the report parser with the past failures or exceptions stored in the NoSQL database;
classify the identified failures or exceptions as a new problem when the identified failures or exceptions do not match with the past failures or exceptions stored in the NoSQL database and store the new problem along with the respective stack trace in the NoSQL database;
recognize the identified failures or exceptions as a known failure when the identified failures or exceptions do not match with the past failures or exceptions stored in the NoSQL database;

the defect-tracking tool configured to create a bug ticket for new failure and change the bug ticket status for known failure from closed to reopen;

the automated notification system configured to notify one or more stakeholders through email or instant messaging whenever the status of the buy ticket is open or reopen; and the dashboard to facilitate access to results, logs, failures and key performance indicators in a form of histograms and pie graphs.

2. The system as claimed in claim 1, wherein the automated test suite is running through an automation server to test the software application and to provide the one or more test execution results in the desired form.

3. The system as claimed in claim 1, wherein the software test automation framework is further configured to test a web application, a mobile application and any other type of software application to provide the test execution results in the desired form.

4. The system as claimed in claim 1, wherein the report parser parsing the test execution results using a programming language.

5. The system as claimed in claim 1, wherein the ML engine is configured to compare the failures or exception with historical data in the NoSQL database to predict whether the failure or exception is new, deferred or known.

6. The system as claimed in claim 5, wherein the system comprises a manual feedback mechanism for receiving feedback from one or more users pertaining to the new problem classification for adjusting the machine learning algorithm and NoSQL database table entries.

7. The system as claimed in claim 1, wherein the automated notification system is configured to notify the stakeholders through email or instant messaging about the status of the bug ticket.

8. A method for automated software testing based on Machine Learning (ML) during a pre-release stage of a software product, the method comprising the steps of:
providing an automated test suite to test a software application and to provide one or more test execution results in a desired form by a software test automation framework;
parsing the test execution results generated from the software test automation framework and identifying failures or exceptions present in the test execution with their respective stack traces by a report parser;
storing historical defect, bug tickets with past failures or exceptions in a NoSQL database;
evaluating matching results of NoSQL database and predicting type of the failure or exception by a ML engine further comprising the steps of:
   I. comparing the identified failures or exceptions received from the report parser with the past failures or exceptions stored in the NoSQL database;
   II. classifying the identified failures or exceptions as a new problem when the identified failures or exceptions do not match with the past failures or exceptions stored in the NoSQL database and store the new problem along with the respective stack trace in the NoSQL database;
   III. recognizing the identified failures or exceptions as a known failure when the identified failures or exceptions do not match with the past failures or exceptions stored in the NoSQL database;
creating a bug ticket for new problem and changing the bug ticket status for known failure from closed to reopen by a defect-tracking tool;
sending notifications to notify about the status of one or more open and reopen bug ticket to one or more stakeholders via email or instant messaging by an automated notification system (107);
receiving manual feedback from one or more users pertaining to the new problem classification for adjusting an ML algorithm and NoSQL database table entries.

9. The method as claimed in claim 8, wherein the automated test suite is running through an automation server to test the software application and to provide the one or more test execution results in the desired form.

10. The method as claimed in claim 8, wherein providing the one or more test execution results comprises testing a web application, a mobile application and any other type of software application using the automated testing framework.

11. The method as claimed in claim 8, wherein the report parser parses the test execution results using a programming language.

12. The method as claimed in claim 8, wherein the ML engine compares the parsed failures or exception with historical data in the NoSQL database to predict whether the failure or exception is new, deferred or known.

13. The method as claimed in claim 12, wherein the predicting whether the failure or exception is new, deferred or known-further comprises the steps of:
   a. creating a new ticket, if the failure is new with the status as "open";

b. changing the status of the bug ticket to "reopen" for existing failure if the status of the bug ticket is "closed";

c. adding a new log comment in the bug ticket stating if the failure is known after changing the status of bug ticket to "reopen"; and d. adding a new log comment if the failure is deferred after changing the status of bug ticket to 'reopen".

14. The method as claimed in claim 8, wherein sending notifications to notify the stakeholders about the status of a bug ticket is done via email or instant messaging.

* * * * *